United States Patent [19]

Schuh

[11] Patent Number: 5,170,430
[45] Date of Patent: Dec. 8, 1992

[54] VOICE-SWITCHED HANDSET RECEIVE AMPLIFIER

[76] Inventor: Peter O. Schuh, 121 Forest Knoll Ln., Fishers, Ind. 46038

[21] Appl. No.: 637,656

[22] Filed: Jan. 4, 1991

[51] Int. Cl.[5] .............................................. H04M 1/60
[52] U.S. Cl. ................................... 379/389; 379/395; 379/390
[58] Field of Search ............... 379/387, 395, 388, 389, 379/390

[56] References Cited

U.S. PATENT DOCUMENTS

| | | | |
|---|---|---|---|
| 3,894,187 | 7/1975 | Shibata et al. ...................... | 379/389 |
| 3,925,618 | 12/1975 | Kato et al. ........................... | 379/389 |
| 4,147,892 | 4/1979 | Miller ................................... | 379/389 |
| 4,466,120 | 8/1984 | Walker, Jr. et al. ................ | 379/395 |
| 4,513,177 | 4/1985 | Nishino et al. ...................... | 379/389 |
| 4,536,888 | 8/1985 | Wilson ................................. | 379/395 |
| 4,555,596 | 11/1985 | Blomley .............................. | 379/389 |
| 4,608,462 | 8/1986 | Blomley et al. ................. | 379/389 X |
| 4,899,380 | 2/1990 | Shimada .............................. | 379/389 |
| 4,955,055 | 9/1990 | Fijisaki et al. ...................... | 379/390 |
| 4,984,265 | 1/1991 | Connan et al. ...................... | 379/390 |
| 4,989,242 | 1/1991 | Arnaud ................................ | 379/390 |
| 5,058,153 | 10/1991 | Caren et al. ..................... | 379/389 X |

FOREIGN PATENT DOCUMENTS

| | | | |
|---|---|---|---|
| 0054555 | 3/1985 | Japan .................................. | 379/389 |
| 0195054 | 8/1986 | Japan .................................. | 379/389 |
| 0143452 | 6/1989 | Japan .................................. | 379/389 |
| 0212950 | 8/1989 | Japan .................................. | 379/389 |

OTHER PUBLICATIONS

Beranek, Acoustics, 1954, McGraw Hill Book Company, NY, NY, Chapter 13, pp. 398–409.

*Primary Examiner*—James L. Dwyer
*Assistant Examiner*—M. Shehata

[57] ABSTRACT

A voice-band receive amplifier for telephone handsets that mitigates loud sidetone and acoustic sing. A receive channel (30) with amplification and voice-switched attenuation is disposed between a receive port of a telephone network (80) at terminals (1a), (1b), and an electro-acoustic receiver (20). A transmit channel (70) having voice-switched attenuation that varies inversely with the receive channel attenuation is disposed between a transmit port of the telephone network at terminals (2a), (2b), and an acousto-electrical microphone (10). A controller (60) with an output lead connecting to the transmit and receive channels has an input lead connecting to the microphone, and an input lead connecting to the receiver. The controller provides a varying DC control signal at its output lead in response to varying levels of transmit and receive signals appearing at the input of the controller. Receive signals are attenuated when transmit levels are at or above a predetermined threshold. The receive channel is also attenuated when receive levels are at or above a predetermined receive threshold, providing compression of high receive levels. The attenuation in each channel is characterized by having more attenuation at high-end voice-band frequencies than at lower frequencies.

7 Claims, 1 Drawing Sheet

VOICE-SWITCHED HANDSET RECEIVE AMPLIFIER

FIELD OF THE INVENTION

This invention is concerned with electronic amplifiers in telephone handsets and, in particular, involves a voice-switched receive amplifier for use by the hearing-impaired or in noisy environments.

BACKGROUND OF THE INVENTION

The need for supplemental amplification for telephone receivers has been recognized by the introduction of products into the marketplace such as feature telephones and public pay telephones with built-in adjustable receive amplification, as well as replacement handsets and in-line modules which contain manually adjustable receive amplifiers. These products are beneficial for people with normal hearing in noisy environments, as well as for people with impaired hearing in normal environments. However, there are a number of shortcomings in providing receive amplification that the prior art has not satisfactorily resolved in the over twenty five years since amplified handsets have been available. Built-in receive amplifiers typically provide up to 12 dB of gain. Most replacement handsets and in-line modules provide gain up to 20 dB. An additional five to ten decibels of gain is desirable for hearing reasons, but not for other unpleasant side effects of high gain. Receive gains around 13 dB can cause a condition known as "sing" to occur when a handset is placed on a hard, acoustically reflecting surface, such as a glass table-top. Sing is a self-sustained, audible oscillation that occurs when the acoustic-to-acoustic loop gain, in part provided by the supplemental receive amplifier, is greater than unity. Sing manifests itself in shrill audible tones which are usually uncomfortable to both the near-end talker and far-end listener.

Increased receive gain normally results in increased sidetone. Sidetone is the part of the near-end talker's voice that couples into the near-end receive circuit through the telephone hybrid network as a result of mismatched network and loop impedances. A certain amount of sidetone is desirable to give the effect of a "live" telephone circuit; however, when a weak receive signal is amplified to a satisfactory level, sidetone is usually amplified to an uncomfortable level. It is well known that talkers tend to subconsciously speak more softly when sidetone is increased. Even so, spontaneous, loud expressions by the near-end talker, such as laughter, can be disconcerting. For this reason, users usually set receive gain at the minimum level needed to compensate for incoming receive levels that vary because of call-to-call differences in transmission conditions and far-end talking levels.

When one talks in a normal level after unwittingly picking up a handset having receive gain set at a high level by a prior user, one can be beset with a sudden, uncomfortably loud sidetone/receive signal. A solution to this problem is addressed in U.S. Pat. No. 4,466,120 issued to Walker, Jr. et al. which automatically resets the receiver gain to nominal when the handset is restored to its switchhook cradle. The Walker solution is burdened by the inconvenience of having to re-establish a new listening level upon each use of the telephone.

For the above stated reasons, manual adjustment of the receive gain is frequently needed.

The well-known, half-duplex technology of voice-switching complementary gains in transmit and receive channels has been used over the years in free-air speakerphone applications to avoid sing. However, in an application where the receiver is close to the ear, as is the case with a handset, voice switching sounds unnatural and distracting because the handset user hears "pumping" of both sidetone and incoming receive levels when the receive channel makes gain transitions. Full-duplex technology, such as with adaptive echo-cancellation, can mitigate these problems, but has the disadvantage of complexity and high costs.

U.S. Pat. No. 4,536,888, issued to Donald R. Wilson, Aug. 20, 1985, teaches receive signal "conditioning" that superficially resembles the instant invention. However, the Wilson patent aspires to provide receive amplification while mitigating acoustic shock. It does not address solutions to sidetone and sing problems, nor does it fully satisfy the need for avoiding frequent gain control adjustments. The Wilson patent provides linear compression (attenuation) or expansion (amplification), as needed to keep output receive signals at about a constant level. This presumably would avoid the need for frequent gain adjustments. However, when the gain is set to provide high amplification, the aforementioned loud sidetone problem must necessarily be present in the invention, indeed aggravated by the automatic additional amplification of low level signals. The Wilson patent also includes voice-switched gain in the transmit channel to suppress local background noise when the talker is quiet. But, it fails to mitigate sing since the transmit and receive channels can simultaneously be at maximum gain. Emphasis of upper voice-band frequencies (2 K-3 KHz range, as herein used) is desirable for users with presbycusis, a hearing loss at the upper voice-band frequencies that affects many in the elderly population as well as younger people with a history of prolonged exposure to hearing-damaging sound levels. Current receive amplifier technology either provides no emphasis for upper voice. band frequencies or requires an inconvenient, separate "treble" control adjustment, in addition to an overall gain adjustment, such as in Radio Shack model 43-27.

A basis for the instant invention lies in the psycho-acoustics of human speech and hearing along with the inherent characteristics of acoustic feedback in telephone handsets: It is known that sidetone at upper voice-band frequencies is perceived to be more irritating than at lower frequencies. The average level of the spoken male voice is highest around 400 Hz and continually decreases at higher frequencies. The typical human ear perceives tones in the 2 K-3 KHz range to be louder than at lower frequencies. (See Beranek, Acoustics, McGraw-Hill Book Company, Inc.,New York, NY, 1954, chapter 13, pp 398,408) Furthermore, receiver-tomicrophone acoustic coupling for conventional telephone handsets resting on acoustically reflecting surfaces is highest in the 2 K-3 KHz range. The implication for realizing a natural sounding, voice-switched, receive amplified handset is to minimize switching in the lower voice frequencies where most of the voice energy occurs, and to provide most of the switching in the 2 K-3 KHZ range, where sing is more of a problem and where sidetone is more irritating.

Accordingly, a broad objective of the invention is to provide a natural sounding, voice-switched receive amplifier that mitigates sidetone and sing. An additional objective is to provide a receive amplifier with a single, manual volume control that automatically emphasizes upper voice-band frequencies in response to high gain settings. A further objective is to provide a receive amplifier that suitably services a wide range of incoming receive levels at a single gain setting.

SUMMARY OF THE INVENTION

The invention achieves the above stated and additional objects by combining in a handset having a transmit channel, a receive channel, a microphone and a receiver: an amplifier disposed in the receive channel with first and second negative feedback loops; a manually operated volume control working in relation with the first feedback loop; two variable impedances, one disposed in the transmit channel and the other disposed in the second feedback loop; and a controller circuit which controls the variable impedances to concurrently modify the gain/attenuation of each channel in response to varying levels of voice signals in the transmit and receive channels. The variable impedances are imbedded within their respective channels such that the receive and transmit channels experience voice-switched attenuation varying inversely relative to one another. When receive and transmit levels are below predetermined thresholds, the transmit channel is attenuated while the receive channel gain varies from unity to its maximum under control of the manual volume control. When the transmit level reaches its threshold, loss in the transmit channel is switched out and a corresponding amount of loss is switched into the receive channel. When the output of the receive channel tries to exceed its threshold level, output receive levels are compressed by automatic gain control (AGC) action. A feature of the invention is that more loss is switched at upper voice-band frequencies than at lower frequencies. An additional feature is that the amount of gain switched is proportional to the amount of gain added by the volume control.

BRIEF DESCRIPTION OF THE DRAWING

The aforementioned and other features and advantages of the instant invention will become more readily apparent to persons skilled in the art by reference to the following detailed description when read in light of the accompanying drawing in which.

DETAILED DESCRIPTION

Figure 1:
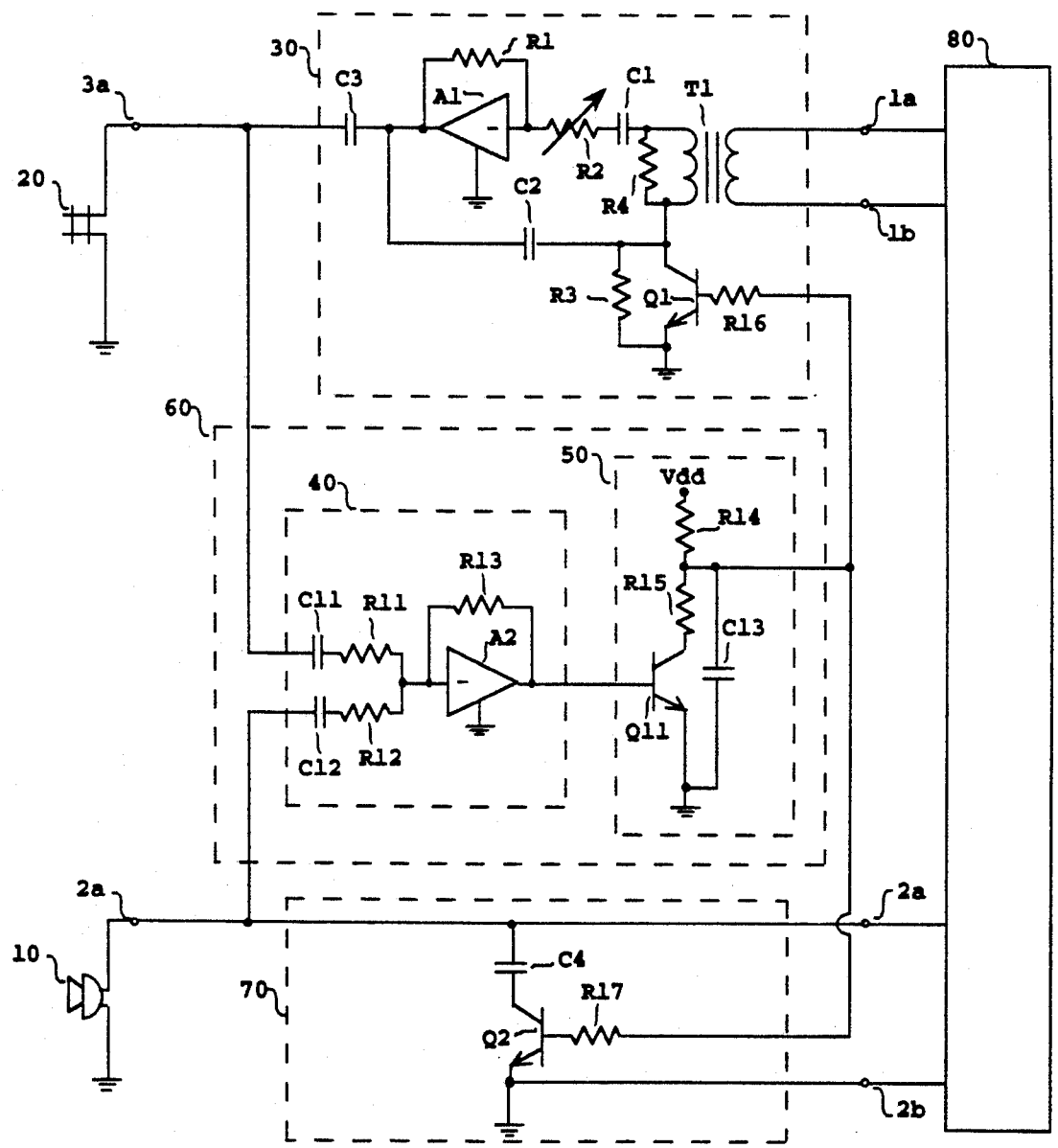
FIG. 1 is a schematic circuit diagram of a preferred embodiment in accordance with the invention.

Now referring to the accompanying drawing FIG. 1, the invention is described hereinafter in a preferred embodiment. Numerous other environments will readily come to mind in which the invention can find use.

The receive port of a host telephone network 80 connects to a receive channel 30 at terminals 1a, 1b. At terminal 3a and a common terminal 2b, the output of the receive channel connects to an electro-acoustic receiver 20, which transduces electrical signals to acoustical signals. An acousto-electric microphone 10, which transduces acoustical signals to electrical signals, connects through a transmit channel 70 to a transmit port of the network at terminals 2a, 2b.

Network 80 is a conventional 2-wire to 4-wire hybrid network, well known to those versed in the art. The network delivers incoming receive signals and a portion of the transmit signal (sidetone) to its receive port; it receives transmit signals at its transmit port, and it provides direct current (DC) line power at its transmit port to bias, among other things, microphone 10. Other details of the network do not pertain to the instant invention.

Receive channel 30 includes an operational amplifier A1; an amplifier input circuit comprising a manually variable potentiometer R2 (volume control) for adjusting gain in the receive channel, and a capacitor C1; two negative feedback loops, the first comprising a resistor R1, the second comprising a capacitor C2, and a resistor R3. Collector-emitter terminals of a transistor Q1 are connected across resistor R3. Also included is a voiceband, 1:1, 300Ω transformer T1 which couples incoming receive signals from the network while providing longitudinal isolation of the receive channel from the network Transmit channel 70 includes a shunt attenuation circuit that includes a series combination of capacitor C4 and collector emitter terminals of a transistor Q2.

Controller 60 comprises a summing amplifier 40 having two inputs, the first connecting to microphone 10 at terminal 2a, the second connecting to the output of the receive channel at terminal 3a, and a rectifier-filter circuit 50 having an input lead that connects to the output of summing amplifier 40. Summing amplifier 40 comprises an operational amplifier A2, a negative feedback loop comprising a resistor R13, a first summing input circuit comprising a capacitor C12 and a resistor R12, and a second summing input circuit comprising a capacitor C11 and a resistor R11. As well known to those skilled in the art, the two summing input circuits allow two different levels of amplification to be provided to their respective input signals. Rectifier-filter circuit 50 includes a resistor 14 which connects to a conventional DC power supply Vdd, a transistor Q11, a resistor R15, and a capacitor C13.

Details for power supply Vdd are not shown, to simplify the drawing and description. As well known in the art, a line-powered supply may be derived from the transmit port of the network, such as one of the schemes described in U.S. Pat. No. 4,319,094 issued to Naganawa et al. on Mar. 9, 1982. A line-powered supply is preferred for applications where sufficient DC line power is available, e.g., about 1.5 volts and 1–3 mA, such as with PBXs and with single off-hook residential telephone set. In applications involving multiple off-hook. telephone sets at long residential loops, a battery is preferred. Also not shown are biasing arrangements derived from power supply Vdd for the operational amplifiers, as this is common knowledge to those versed in the art.

OPERATION

The controller output provides a varying DC control signal to the bases of transistors Q1, Q2 through resistors R16, R17 respectively, in response to varying levels of the transmit and receive signals. Resistors R16, R17 are chosen to be equal to one another, their purpose being to help ensure equal base currents into the bases of transistors Q1, Q2. Transistors Q1, Q2 act as variable resistances, exhibiting low resistance when the control signal is "high", high resistance when the control signal is "low", and intermediate values of resistance for corresponding intermediate control signal levels. Transistors Q1, Q2 are chosen so that their respective resistances are approximately equal to one another at any given control signal level. The effect of transistors Q1, Q2 varying between their high and low resistance states is to switch complementary attenuation between the receive and transmit channels. As well known to those versed in the art, the function of transistors Q1, Q2 could be effected equally well by other devices which can exhibit variable impedance such as field-effect transistors and photo-transistors.

Capacitor C4 and transistor Q2 determine loss in the transmitter channel. The value of capacitor C4 is chosen to effect moderate shunt attenuation at low frequencies, around 300 Hz, and increasing attenuation at increasing frequencies, when transistor Q2 is in a low resistance state. When Q2 is in a high resistance state, it provides nil shunt attenuation to the transmit channel.

When transistor Q1 is in a low resistance state, it removes negative feedback from the second feedback loop by shunting resistor R3. This is the normal listening, or quiescent, state of the receive channel which is in effect when both transmit and receive levels are below predetermined threshold levels. In the quiescent state, the gain of the receive channel is determined by resistor R1 in ratio with the series sum of the impedances of potentiometer R2 and capacitor C1. At the upper frequency of the receive signal (about 3 KHz), the impedance of capacitor C1 is chosen to be small relative to the maximum value of potentiometer R2, and large relative to the minimum value of potentiometer R2. In this way the quiescent gain of the receive channel advantageously provides a "flat" frequency response at low and medium gain settings and emphasizes high frequency response at higher gain settings. Potentiometer R2 can be varied from 0.10 K$\Omega$. When resistor R1 is 10K$\Omega$, and capacitor C1 is 0.22$\mu$F, and potentiometer R2 is set at 0$\Omega$, receive signals are amplified about 25 db, with signals at 3 KHz amplified about 15 db, more than signals at 300 Hz.

When transistor Q1 is in a high resistance state, it has negligible shunting effect on resistor R3. Attenuation is then provided to receive signals in two ways: 1. The second negative feedback circuit increases attenuation at increasing frequencies by providing negative feedback across resistor R3, through capacitor C2. 2. Resistor R3 increases the effective impedance of the input circuit of amplifier A1, thereby further attenuating the receive channel. The advantageous effect of resistance R3 adding to the impedance of the input circuit is that the attenuation in the receive channel is less when potentiometer R2 is maximum (quiescent gain setting) than when potentiometer R2 is minimum (maximum gain setting). Advantageously, when high frequency emphasis is being provided by capacitor C1, it is that high frequency emphasis that is first removed during voice-switching.

At transmit and receive levels below threshold, the gain and bias of amplifier A2 are chosen such that peak voltages at its output lead are insufficient to activate transistor Q11. When transistor Q11 is non-conducting, the output lead of rectifier-filter circuit 50 is driven high by power supply Vdd through resistor R14. When either transmit or receive levels reach their respective threshold levels, the voltage at the collector of transistor Q11 is driven toward ground on positive peak cycles thereby driving the controller output low through resistor R15. Capacitor C13 serves as a low-pass filter, as well as helps to determine the charge (attack-time) and discharge (release-time) characteristics of the control signal. In association with resistors R14, R15, R16, R17, capacitor C13 is chosen to provide a fast, but not too fast discharge time, and a slow, but not too slow charge-time. Thus the control signal tends to approximately follow the average of the absolute value of the sum of the envelopes of the amplified signals from the transmit and receive channels. In addition, the values of resistors R14, R15, R16, R17 are chosen so that, relative to either resistance R3 or the impedance of microphone 10, the resistance values of transistors Q1, Q2 are small when the control signal is high, and large when the control signal is low.

Transmit and receive threshold levels are determined as follows: Component values in the first summing input circuit of summing amplifier 40 are chosen, along with resistor R13, so that voice. band acoustic signals of about 60 dB relative to 20$\mu$Pa (reference threshold of hearing) into microphone 10 cause the control signal to go low, thereby switching attenuation out of the transmit channel. Component values in the second summing input circuit are chosen, along with resistor R13, so that voice-band acoustic signals at receiver 20 of about 90 dB relative to 20 $\mu$Pa cause the control signal to be driven toward a low state, thereby providing AGC action in the receive channel to compress signals above that level.

Since switched attenuation in the transmit channel varies inversely with that of the receive channel, AGC action in the receive channel switches a corresponding amount of loss from the transmit channel. This has the advantageous effect of minimizing the amount of switched attenuation that occurs when near-end and far-end parties are interrupting each other. A further advantage of AGC is to soften loud signals, such as dial-tone, and loud talkers. An even further advantage of AGC is to improve linearity by helping to keep loud signals within the linear operating region of the receive channel. Thus, with the previously described switched-attenuation characteristics mitigating sidetone and sing problems, and with AGC action mitigating the effects of excessively loud receive signals, the instant invention requires little, if any, adjustment of the gain setting. In some applications, such as in public telephones, it allows a single gain setting, thereby eliminating an external volume control which would otherwise be subject to acts of vandalism.

Capacitor C3 serves as a DC blocking capacitor. Resistor R4 is an input impedance setting resistor.

Transistors Q1, Q2, Q11 are npn silicon transistors such as Motorola MPS 2N3904 Microphone 10 is an electret microphone such as EM80P, and receiver 20 is an electromagnetic receiver such as DH60, both available from Primo Microphone Inc., Tokyo, Japan. Amplifiers A1,A2 are conventional operational amplifiers such as National Semiconductor model LM10.

It is understood that the presently preferred embodiment described herein is merely illustrative of the principles of the invention. Various modifications may be made thereto by persons skilled in the art without departing from the scope of the invention. Additionally, while the invention is primarily directed at telephone handset applications, it could be employed equally as well in telephone bases, modular in-line amplifiers, operator head telephone sets, speakerphone sets, or other situations requiring mitigation of sidetone or sing, or both. It is my intention that the following claims cover all equivalent modifications and variations as followed within the scope of the invention.

What I claim is:

1. In a voice-band communication system, an apparatus for interfacing a microphone and a speaker to a hybrid network having a transmit port for receiving transmit signals and a receive port for delivering receive signals, said apparatus comprising:

receive channel means coupled between the receive port and the speaker for providing varying, frequency-dependent gain to the receive signals in response to changes in a control signal;

transmit channel means responsive to the changes in the control signal and coupled between the microphone and the transmit port for providing varying transmit gain to the transmit signals, with said transmit gain varying in complementary relation to said receive gain; and control means having input means coupled to the transmit channel means and output means coupled to the transmit channel means and to receive channel means for monitoring transmit signals and for producing and varying said control signal to cause the transmit gain to increase and the receive gain to decrease in proportion to changes in the control signal when the transmit signal is at least greater than a transmit threshold level.

2. The apparatus in accordance with claim 1 wherein the control means further includes means coupled to the receive channel means for monitoring receive signals and means for varying said control signal to cause the receive gain to decrease in proportion to increasing changes in the control signal when the receive signal is at least greater than a receive threshold level, thereby providing automatic gain control for receive signals.

3. In a telephone speech communication system having a receiver which is used in proximity with the user's ear, and a microphone, and a receive port for delivering receive signals from a telephone line, and a transmit port for delivering transmit signals to said telephone line, an amplification circuit comprising:

transmit channel means coupled to said microphone for receiving transmit signals from said microphone, and coupled to said transmit port for delivering the transmit signals;

said transmit channel means further including a transmit attenuation means for providing variable, frequency-dependent attenuation to the transmit signals in response to changes in a control signal;

receive channel means coupled to said receive port for receiving receive signals, and coupled to said receiver for delivering the receive signals;

said receive channel means further including a receive amplification means for amplifying the receive signals;

said receive channel means further including a receive attenuation means for providing variable, frequency-dependent attenuation to the receive signals to inverse relationship with said transmit attenuation means, in response to said same changes in said control signal;

control means coupled to the transmit channel means for monitoring transmit signals and for producing and varying said control signal to cause the transmit gain to increase and the receive gain to decrease in proportion to changes in the control signal when the transmit signal is at least greater than a transmit threshold level, thereby mitigating adverse effects of sidetone and mitigating tendencies of the system to self-oscillate.

4. The amplification circuit in accordance with claim 3 wherein said control means further includes means coupled to the receive channel means for monitoring the receive signals and for varying said control signal to cause the receive attenuation to increase in proportion to changes in the control signal when the receive signal is at least greater than a receive threshold level, thereby providing automatic gain control for receive signals.

5. The amplification circuit in accordance with claim 3 wherein said receive channel means further includes volume control means for manually adjusting receive gain.

6. The amplification circuit in accordance with claim 5 further including means for rendering the amount of varying receive attenuation to be proportional to the amount of gain added by the volume control means.

7. The amplification circuit in accordance with claim 5 wherein said volume control means further includes means for providing to receive signals flat frequency response at low gain adjustment settings and for providing increased emphasis to high frequencies at higher gain adjustment settings.

* * * * *